UNITED STATES PATENT OFFICE.

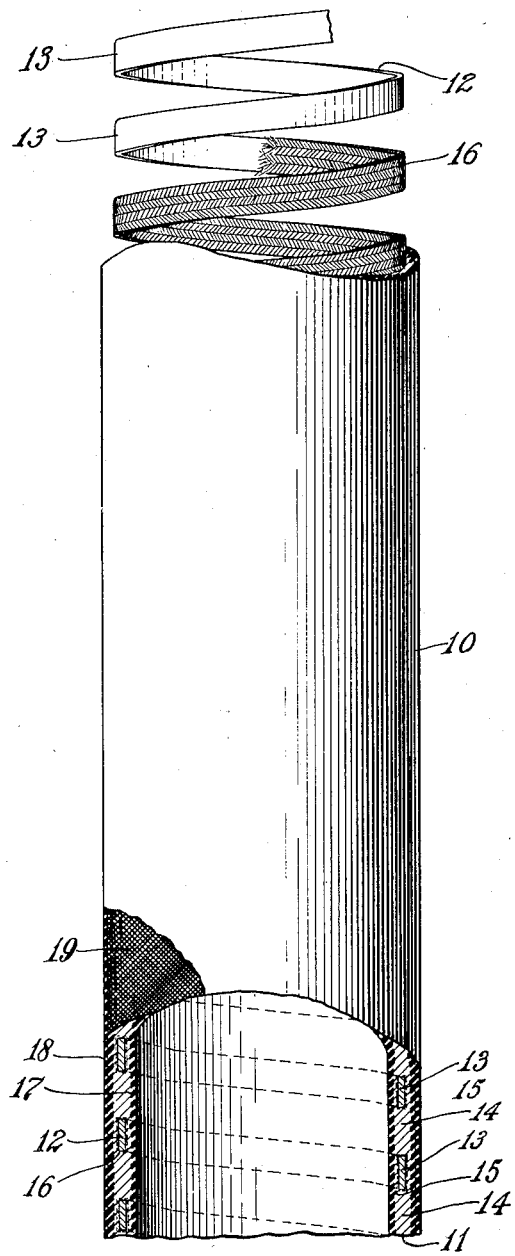

JOHN R. GAMMETER, OF AKRON, OHIO, ASSIGNOR TO THE B. F. GOODRICH COMPANY, OF NEW YORK, N. Y., A CORPORATION OF NEW YORK.

REINFORCED-RUBBER ARTICLE.

1,394,300.   Specification of Letters Patent.   Patented Oct. 18, 1921.

Application filed March 22, 1920. Serial No. 367,759.

*To all whom it may concern:*

Be it known that I, JOHN R. GAMMETER, a citizen of the United States, residing at Akron, in the county of Summit and State of Ohio, have invented a certain new and useful Reinforced-Rubber Article, of which the following is a specification.

This invention relates to rubber articles having metal or similar reinforcing means embedded in their walls and, more especially to reinforced vacuum or pressure hose. The principal objects of the invention are to prevent chafing of the rubber by the reinforcement, to prevent a cracking of the rubber near the reinforcing means and to provide for a more uniform stretching of the rubber in the article when the latter is bent or stretched, than has heretofore been possible.

The drawing shows a side elevation of a hose embodying my invention, a part thereof being shown in section and a part broken away.

The hose 10 has a wall including an intermediate soft rubber layer 11 which is stretched during a bending or stretching of the hose. The reinforcing means shown is a flat steel ribbon or strip 12 wound into the form of a helix whose elements or coils 13 are embedded in the soft layer 11 and partially separate the latter into thick portions 14 and thin portions 15. The ribbon 12 is incased in a braided fabric sheath 16 preferably woven on the bias to permit a limited stretching of the sheath transversely of the ribbon and longitudinally of the hose. The inner and outer layers 17, 18 are formed of a rubber composition which is relatively hard, when vulcanized, to withstand wear, and a fabric layer 19 is embedded in the outer rubber layer 18, further to strengthen the hose. The three rubber layers and the fabric elements are united by vulcanization.

Thus the metal ribbon is embedded in a helical channel formed in soft rubber which is reinforced by the sheath 16, so that the rubber wall will not crack at the corners of the ribbon. The ribbon slides easily in said sheath, during a bending or stretching of the hose, and prevents rubbing of the metal reinforcement on the soft rubber. The fabric 16 also forms a more or less yielding tie between adjacent thicker rubber portions 14 and limits the stretching of the intervening thinner rubber portions 15. This prevents an undue stretching of said thin portions which would weaken them, causes the thicker rubber portions 14 to stretch more than they otherwise would and results in a longer life of the hose. The soft rubber portion of the hose wall distributes the expanding and contracting strains and otherwise allows for differences in character of the metal and of the harder layers of rubber both in use and manufacture of the hose.

I do not desire to be limited to the exact construction shown but contemplate any suitable modification within the scope of my claim.

I claim:

A hose having inner and outer tubular portions of relatively-hard wear-resisting rubber, a tubular fabric layer embedded in the outer portion, a soft rubber layer uniting the inner and outer portions, and a reinforcement comprising a metallic helix incased in a fabric sheath embedded in and vulcanized to the soft rubber layer.

In witness whereof I have hereunto set my hand this 18 day of March, 1920.

JOHN R. GAMMETER.